(12) United States Patent
Tochigi

(10) Patent No.: US 7,224,498 B2
(45) Date of Patent: May 29, 2007

(54) IMAGE READING APPARATUS

(75) Inventor: Nobuyuki Tochigi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 954 days.

(21) Appl. No.: 10/331,541

(22) Filed: Dec. 31, 2002

(65) Prior Publication Data

US 2003/0161013 A1 Aug. 28, 2003

(30) Foreign Application Priority Data

Jan. 7, 2002 (JP) .............................. 2002-000919

(51) Int. Cl.
*H04N 1/04* (2006.01)

(52) U.S. Cl. ...................... 358/474; 358/482; 358/483; 382/167; 382/154; 359/689; 250/201.8

(58) Field of Classification Search ................ 358/474, 358/482, 483; 382/167, 154; 355/53, 67; 359/689; 250/201.8
See application file for complete search history.

(56) References Cited

U.S. PATENT DOCUMENTS

| | | | | |
|---|---|---|---|---|
| 4,359,269 A | * | 11/1982 | Itoh ............................ | 359/679 |
| 4,585,314 A | * | 4/1986 | Tateoka ....................... | 359/761 |
| 5,633,745 A | | 5/1997 | Chen et al. .................. | 359/201 |
| 5,764,462 A | | 6/1998 | Tanaka et al. ................ | 361/42 |
| 5,786,582 A | | 7/1998 | Roustaei et al. ............. | 235/462 |
| 6,147,811 A | * | 11/2000 | Fujibayashi .................. | 359/689 |
| 6,563,567 B1 | * | 5/2003 | Komatsuda et al. .......... | 355/71 |

FOREIGN PATENT DOCUMENTS

| | | |
|---|---|---|
| EP | 0 913 718 A2 | 5/1999 |
| JP | 9-113804 | 5/1997 |
| JP | 9-329745 | 12/1997 |
| JP | 10-206735 | 8/1998 |

\* cited by examiner

*Primary Examiner*—Aung S. Moe
*Assistant Examiner*—Negussie Worku
(74) *Attorney, Agent, or Firm*—Fitzpatrick, Cella, Harper & Scinto

(57) ABSTRACT

Disclosed is an image reading apparatus which includes an illumination system, a reading unit, and an imaging optical system for imaging imagewise information provided on a surface of an original as illuminated by the illumination system, upon a surface of the reading unit. The imaging optical system includes, in an order from the original surface side, a first lens group of negative refractive power, a second lens group of positive refractive power, and a third lens group of negative refractive power. The image reading apparatus has a focal point position adjusting function and a focal length changing function based on movement of at least one of the lens groups of the imaging optical system. In the imaging optical system, a condition $0.01 < R \times K/F < 1.00$ is satisfied where R is resolution per single line in a main scan direction of said image reading apparatus, K is picture element size of the reading unit, and F is F number of the imaging optical system at a largest imaging magnification.

7 Claims, 7 Drawing Sheets

IMAGE READING APPARATUS

FIELD OF THE INVENTION AND RELATED ART

This invention relates to an image reading apparatus and, more particularly, the invention is suitably applicable to an image scanner, a film scanner, and a digital image reading apparatus such as a digital copying machine, for example, wherein imagewise information of an image (upon a surface of an original) is read by use of a line sensor (CCD), for example.

Conventionally, there are image scanners or film scanners which are known as an apparatus for reading a paper image or imagewise information provided on a film and for storing the data into a computer as digital imagewise information.

As for an image reading lens to be used in such scanner apparatuses, it is desired that distortion aberration and chromatic aberration are well corrected and also that the decrease of marginal light quantity is small. Also, for the very purpose of reading imagewise information of an image, usually, it should have a lateral magnification which is in a relatively low magnification range of about −0.1 to −1.2 (unit magnification). Furthermore, for compactness of the layout of an optical system which has been required from the standpoint of recent down sizing, a projection lens (image reading lens) that determines the optical system layout should have a wider angle.

Additionally, the required resolution is increasing in recent years and, to meet this, the optical system should have a higher resolution. However, the dpi (dot per inch) has been increased in recent years, and further improvement of performance is becoming very difficult due to the diffraction limit.

Enlarging the magnification of an optical system may be a possible measure to avoid this. As an example, a lens having a large magnification may be added, or the object-to-image distance may be changed to vary the magnification. Alternatively, the spacing between lenses of a lens system may be changed to vary the magnification.

However, from the standpoint of down sizing and compactness recently required, the addition of a separate lens or using a structure to change the object-to-image distance is contradictory to them because it leads to enlargement in size as a whole.

In consideration of it, changing the spacing of lenses of a lens system (i.e. using a variable magnification lens) may be a best resolution. Image reading apparatuses using such a variable magnification lens are proposed in Japanese Laid-Open Patent Application No. 63-60886 (U.S. Pat. No. 4,585, 314), No. 9-113804 (U.S. Pat. No. 5,764,426), No. 9-329745, and No. 10-206735.

Japanese Laid-Open Patent Application No. 9-113804 shows a variable magnification optical system which comprises, in an order from an object side, a negative first lens group and a positive second lens group, wherein the spacing between the first and second lens groups are changeable to change the focal length of the whole lens system.

Japanese Laid-Open Patent Application No. 9-329745 shows a variable magnification lens which comprises, in an order from the object side, a first lens group having a negative refractive power, and a second lens group having a positive refractive power, wherein only the second lens group is moved in an optical axis direction without moving the first lens group in the optical axis direction, whereby the imaging magnification is changed while holding the image plane at a constant position.

However, the optical systems disclosed in these publications involve inconveniences that the distortion magnification is very large such that the performance as a lens for use in image reading is insufficient. Further, although insufficiency of reduction in cost is discussed in these documents in relation to the prior art, a very expensive material of anomalous dispersion glass having an abbe's number of 80 or more is contradictorily used in its embodiment.

Japanese Laid-Open Patent Application No. 10-206735 shows a zoom lens of three-group structure which comprises, in an order from enlargement side, a first lens group, a second lens group having a positive refractive power, and a third lens group having a negative refractive power, wherein these lens groups are moved to change the magnification.

In the structure disclosed in this document, however, the chromatic aberration varies much with the magnification change. Even if a good performance is obtainable with respect to a certain zoom position, the best focus position would be changed by the magnification change due to the chromatic aberration. This is insufficient as the performance of a lens to be used for the image reading.

SUMMARY OF THE INVENTION

It is accordingly an object of the present invention to provide an image reading apparatus in which an imaging optical system is provided with focal length changing means and focal point position adjusting means and, by setting the components appropriately, high resolution image reading is assured.

It is another object of the present invention to provide an image reading apparatus having a resolution of 1200 dpi or more, in which satisfactory optical performance is assured regardless of the magnification change.

In accordance with an aspect of the present invention, there is provided an image reading apparatus, comprising: illumination means; reading means; and an imaging optical system for imaging imagewise information provided on a surface of an original as illuminated by said illumination means, upon a surface of said reading means, said imaging optical system including, in an order from the original surface side, a first lens group of negative refractive power, a second lens group of positive refractive power, and a third lens group of negative refractive power; wherein said image reading apparatus has a focal point position adjusting function and a focal length changing function based on movement of at least one of the lens groups of said imaging optical system; and wherein a condition $0.01 < R \times K/F < 1.00$ is satisfied where R is resolution per single line in a main scan direction of said image reading apparatus, K is picture element size of said reading means, and F is F number of said imaging optical system at a largest imaging magnification.

In one preferred form of this aspect of the present invention, the first lens group is held fixed for magnification change, wherein the focal length can be changed by moving at least one of the second and third lens groups in an optical axis direction, and wherein the focal point position can be adjusted by moving at least one of the second and third lens groups.

The first lens group may include a negative first lens and a positive second lens having a concave surface facing to the reading means side, wherein the second lens group may include a positive first lens, a positive second lens, a negative third lens, and a positive fourth lens, and wherein said third lens group may include a negative or positive first lens, and a negative second lens.

Magnification change can be carried out by moving the second and third lens groups so that the spacing between the first and second lens groups at a telephoto end becomes smaller than that of the first and second lens groups a wide-angle end and so that the spacing between the second and third lens groups at a telephoto end becomes smaller than that of the first and second lens groups at a wide-angle end.

The focal point position can be adjusted by moving one of the first to third lens groups which has a lightest weight.

The focal point position can be adjusted by moving the second lens group, wherein a condition $0.04<Lt/F2<0.10$ may be satisfied where $F2$ is the focal length of the second lens group, and $Lt$ is one of (i) the spacing between the first and second lens groups at a telephoto end and (ii) the spacing between the second and third lens groups, which is narrower than the other.

The focal point position can be adjusted by moving the third lens group, wherein a condition $-0.015<Lt2/F3<-0.01$ may be satisfied where $F3$ is the focal length of the third lens group, and $Lt2$ is the spacing between the second and third lens groups at a telephoto end.

Conditions $-0.5<F2/F1<-0.2$ and $$0.3 < BFw/\sqrt{(Fw \times Ft)} < 0.9$$

may be satisfied, where $Fi$ is the focal length of the i-th lens group, $Fw$, and $Ft$ are focal lengths of the whole system at a wide-angle end and a telephoto end, respectively, and $BFw$ is the distance from the final lens surface to said reading means at a wide-angle end.

The image reading apparatus may have a resolution of not less than 1200 dpi.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Preferred embodiments of the present invention will now be described with reference to the attached drawings.

Figure 1:
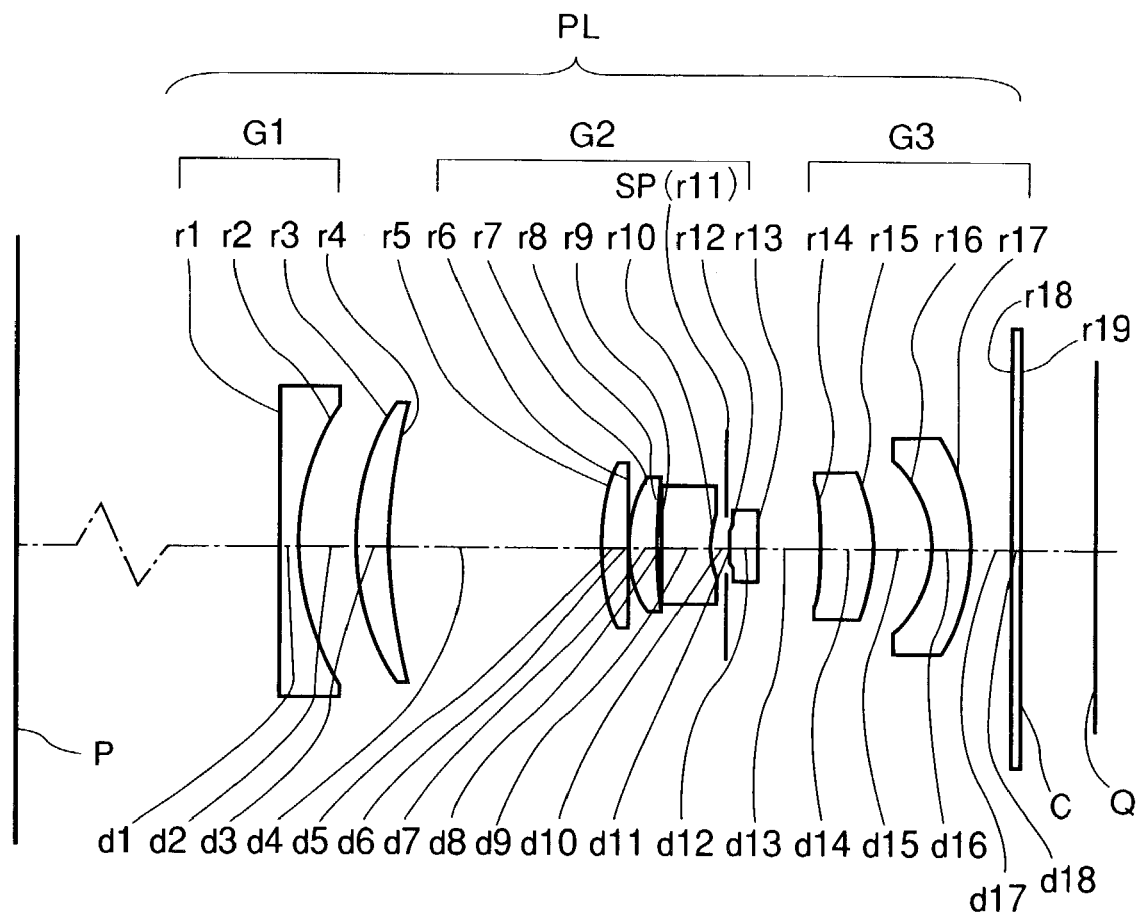
FIG. 1 is a sectional view of a lens system according to a first embodiment of the present invention.
Figure 2A:
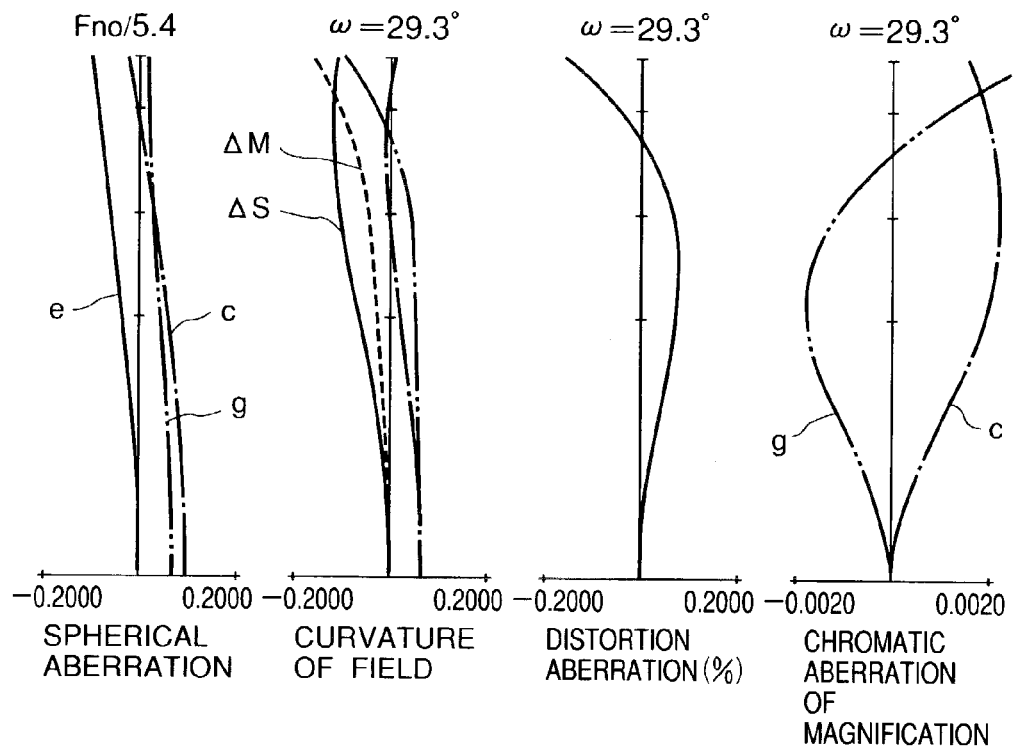
FIGS. 2A and 2B illustrate aberrations at a wide-angle end and a telephoto end, in the first embodiment of the present invention.
Figure 2B:
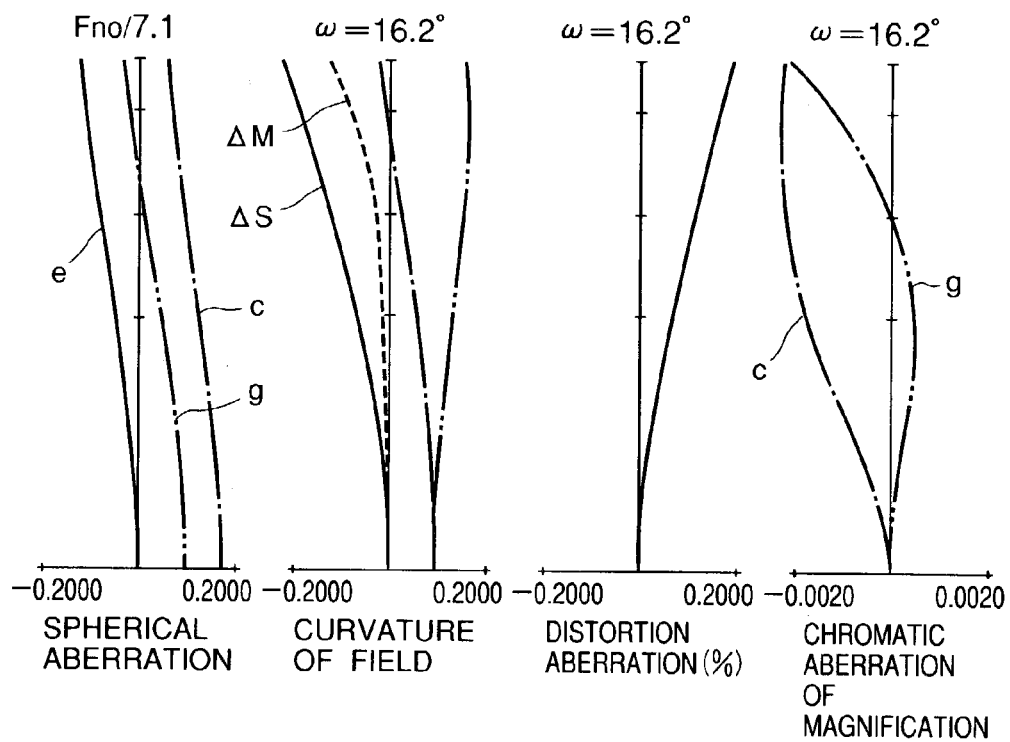
Figure 3A:
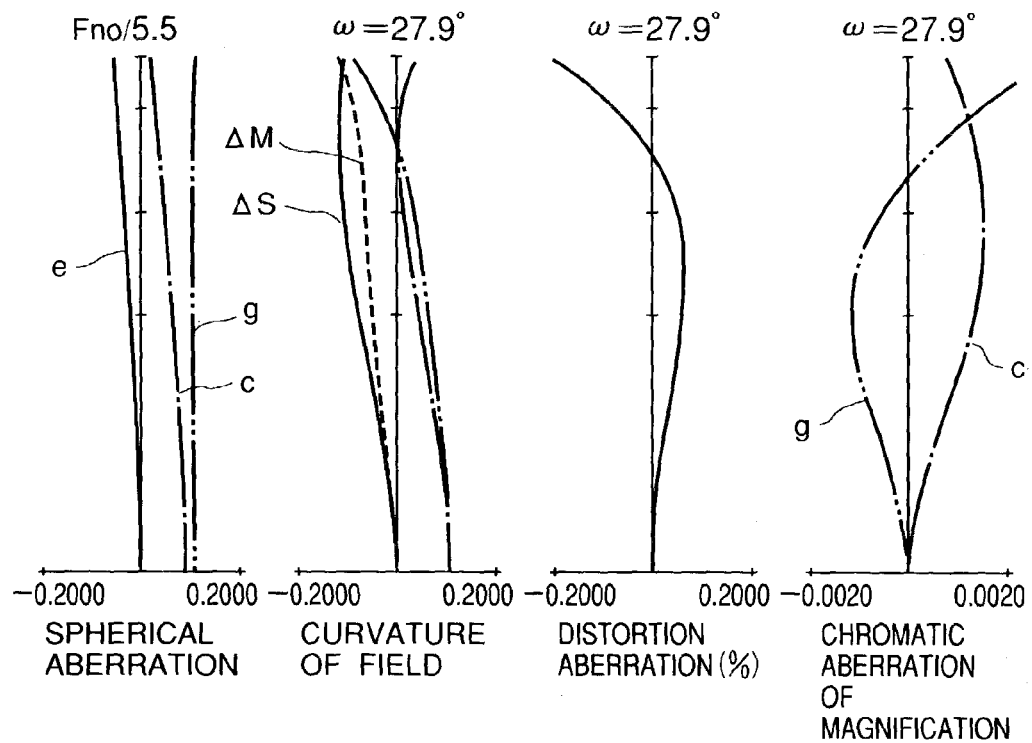
FIGS. 3A and 3B illustrate aberrations at a wide-angle end and a telephoto end, in a second embodiment of the present invention.
Figure 3B:
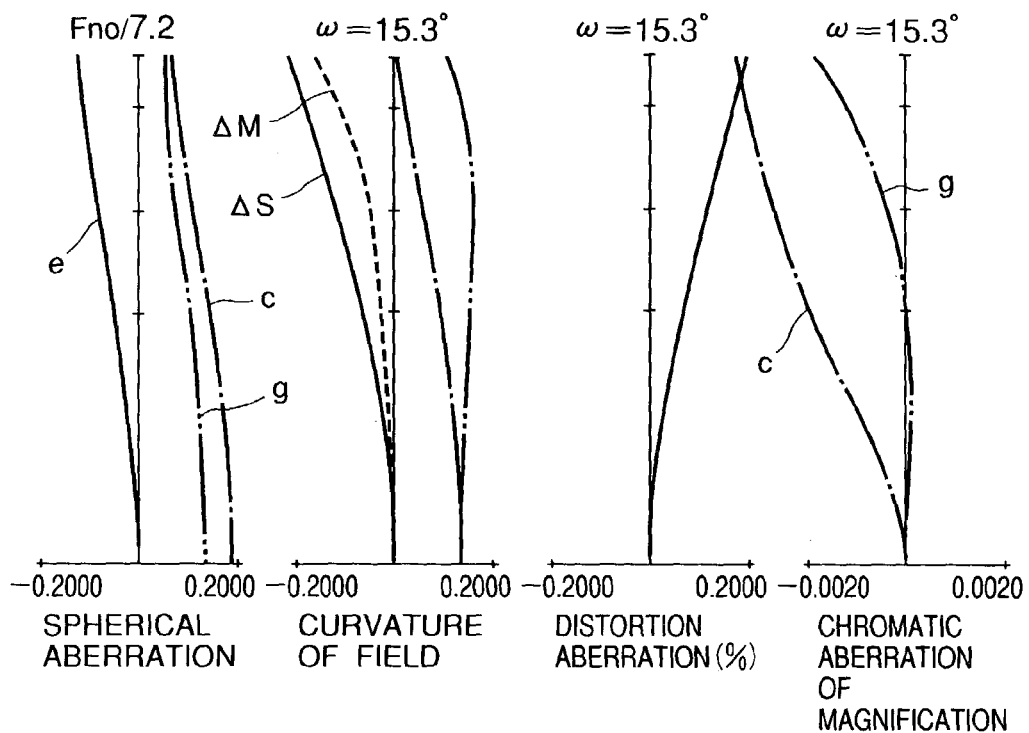
Figure 4A:
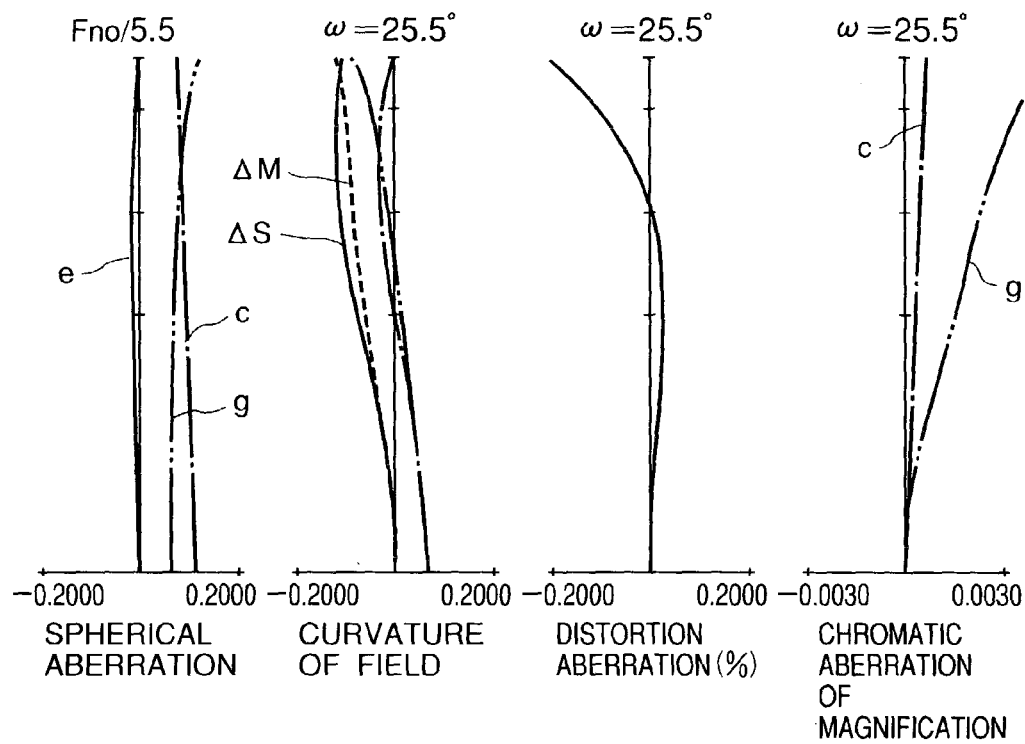
FIGS. 4A and 4B illustrate aberrations at a wide-angle end and a telephoto end, in a third embodiment of the present invention.
Figure 4B:
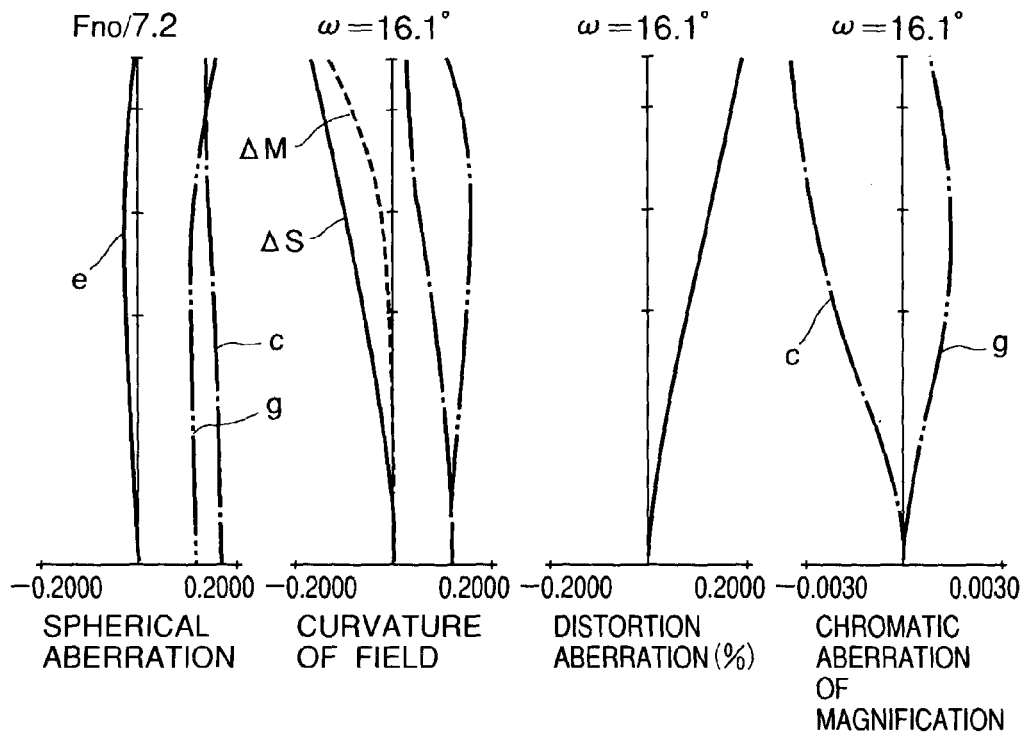
Figure 5A:
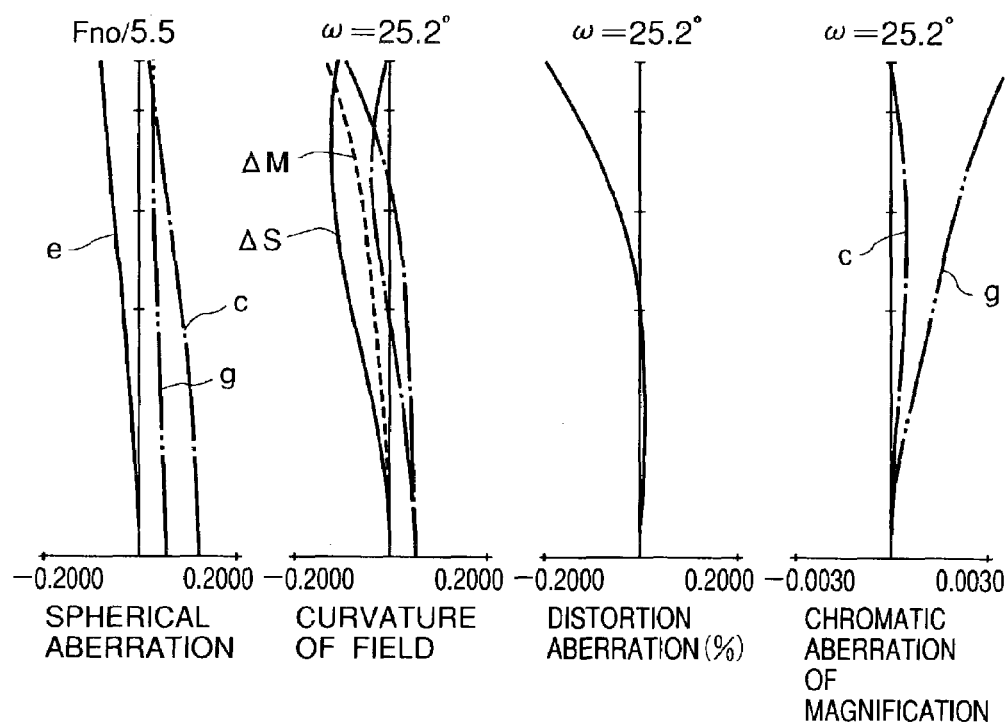
FIGS. 5A and 5B illustrate aberrations at a wide-angle end and a telephoto end, in a fourth embodiment of the present invention.
Figure 5B:
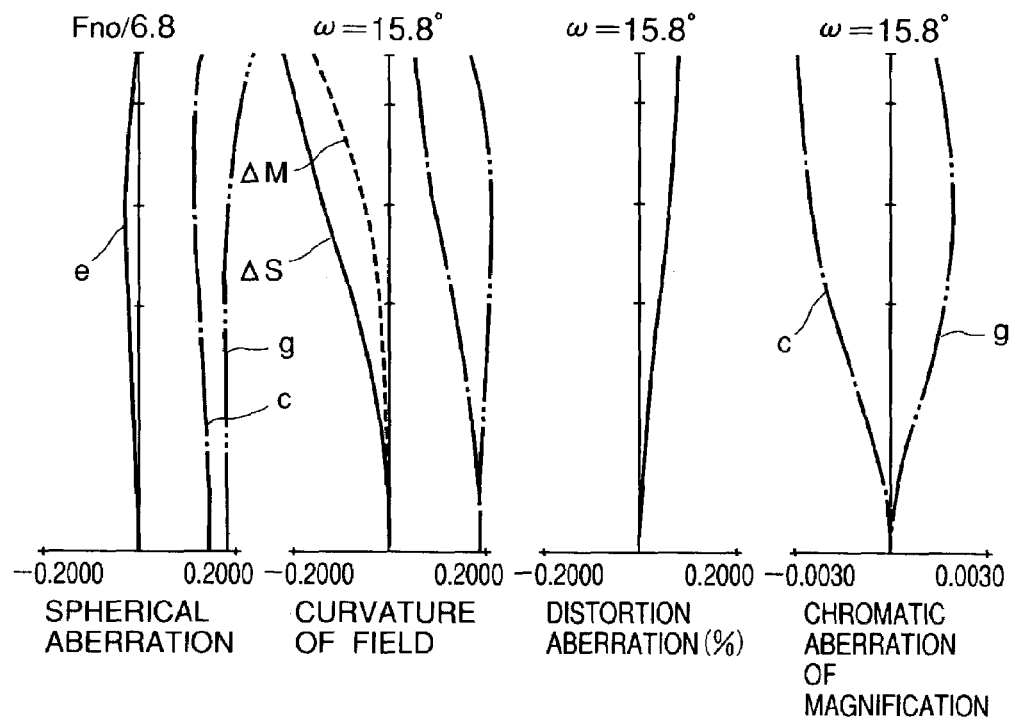
Figure 6A:
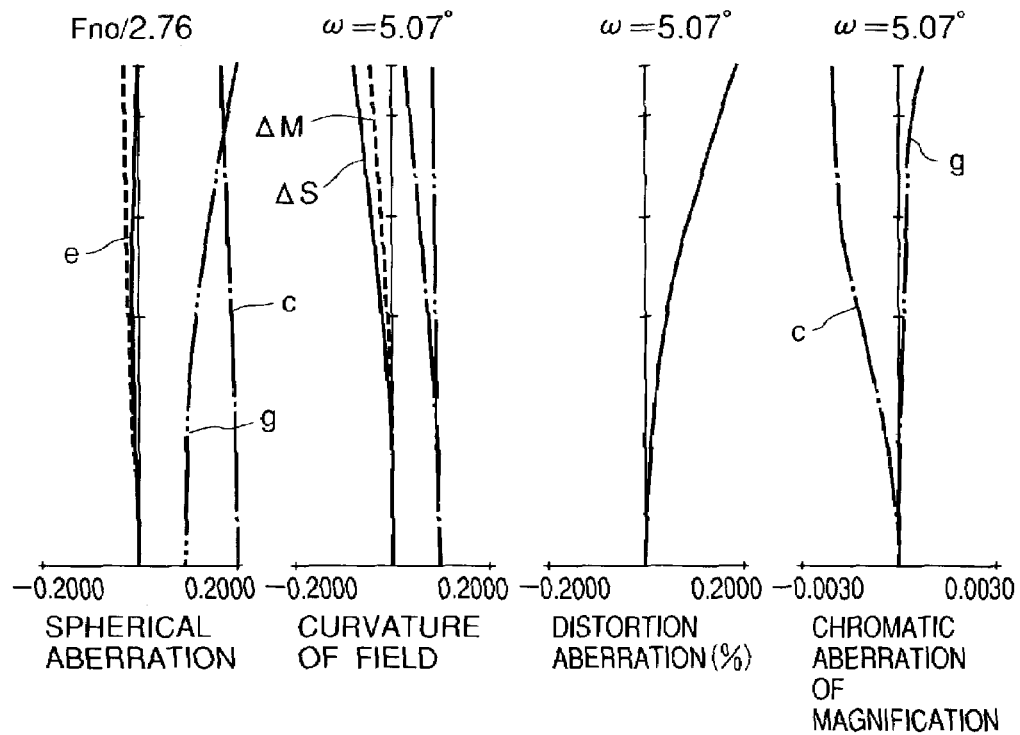
FIGS. 6A and 6B illustrate aberrations at a wide-angle end and a telephoto end, in a fifth embodiment of the present invention.
Figure 6B:
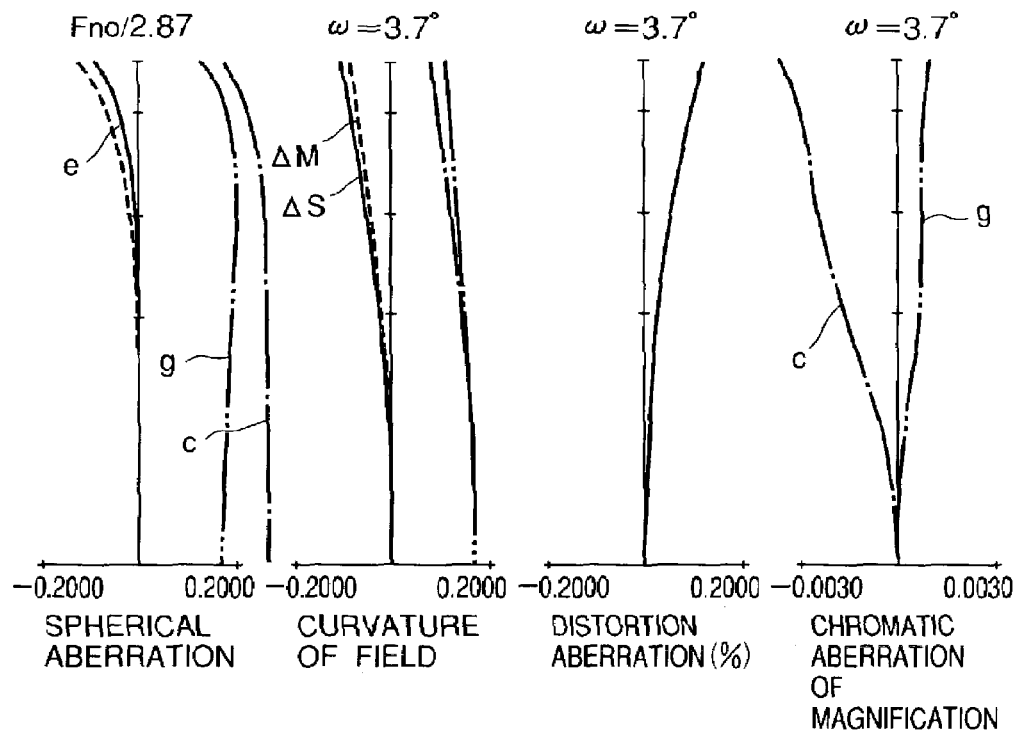

FIG. 1 is s sectional view of a lens system according to a first embodiment of an imaging optical system (original reading lens) to be used in an image reading apparatus of the present invention. FIGS. 2, 3, 4, 5, and 6 show aberrations of first to fifth embodiments of an imaging optical system, to be used in an image reading apparatus of the present invention.

In this specification, the direction (lengthwise direction) in which picture elements of a CCD are arrayed is referred to a main scan direction, and a direction orthogonal thereto is referred to as a sub scan direction.

In the lens sectional view, the left-hand side corresponds to enlargement side (longer conjugate point) facing to an original P surface (there is an image to be read), while the right-hand side corresponds to reduction side (shorter conjugate point) facing to an image plane Q (there is a reading element such as CCD). In the drawing, just before the image plane Q, there is a cover glass or face plate for the CCD.

Denoted in FIG. 1 at PL is an imaging optical system (image reading lens) which is provided with focal length changing means and focal point position adjusting means. It serves to image the imagewise information provided on an original surface P, as illuminated by a light source such as Xe (xenon) lamp, for example, upon the surface Q of reading means. Denoted at P is the surface of an original on which imagewise information is provided. Denoted at Q is a line sensor (CCD) which functions as reading means. Denoted at SP is a stop, and denoted at C is a cover glass or face sheet for the CCD.

The imaging optical system of the first embodiment shown in FIG. 1 comprises three lens groups, that is, in an order from the original surface P side, a first lens group G1 having a negative refractive power, a second lens group G2 having a positive refractive power, and a third lens group G3 of negative refractive power.

The first lens group G1 includes a negative first lens (11 lens) having a concave surface of stronger refractive power, facing to the reading means Q side, as compared with the surface facing to the original surface P side, and a positive second lens (12 lens). The second lens group G2 includes a positive first lens (21 lens), a positive second lens (22 lens), a negative third lens (23 lens), and a positive fourth lens (24 lens). The third lens group G3 includes a negative or positive first lens (31 lens) and a negative second lens (32 lens).

As described above, the imaging optical system of this embodiment is provided with focal length changing means and focal point position adjusting means. For magnification change, while the first lens group G1 is held fixed, the second and third lens groups G2 and G3 are moved in an optical axis direction to thereby change the magnification. Also, the second lens group G2 and/or the third lens group G3 is moved to perform adjustment of the focal point position. With this arrangement, in this embodiment, any focus position error due to variation in chromatic aberration caused by the magnification change, any positional deviation of the original position with respect to the optical axis direction, and any focus position error due to a manufacturing error, can be corrected.

For the magnification change from a wide-angle end side to a telephoto end side in this embodiment, the second lens group G2 and the third lens group G3 are moved in the manner that both the spacing between the first and second lens groups G1 and G2 and the spacing between the second and third lens groups G2 and G3 are narrowed.

Also, in this embodiment, as regard the lens group to be used for adjustment of the focal point position, one of the lens groups which is lightest in weight (specifically, the second lens group G2 or third lens group G3) is used.

Conventionally, because of large depth of focus of lens, focal point position adjusting means was unnecessary. More specifically, if the lateral magnification of a lens is β, the magnification in the focus direction (longitudinal magnification) α is expressed by a α=β×β. If therefore the magnification β is −0.189, a change of the original position in this lens by 1 mm causes a shift of 0.036 mm upon the image plane. Namely, a change of 1 mm on the image plane corresponds to a change of 28 mm on the original surface. This means that, provided that the depth of focus at the image plane is 0.1 mm, a change of 2.8 mm of the original surface would still be within the depth of focus.

However, because of recent improvements of resolution up to or more than 1200 dpi, there is a problem that, even within the depth of focus, if deviation from the focus position is large, the read image becomes dull. In this embodiment, in consideration of it, the second lens group G2 and/or the third lens group G3 is provided with a focal point position adjusting function.

The shift of the position of the focal point position adjusting lens group may cause a slight change of magnification. However, the amount of magnification change is very small, and in many cases, it does not raise a problem. Of course, to correct this, any mean for electrically correcting the magnification change amount due to the change in position of the lens group may be used. By forming individual lenses into predetermined shapes, the rear principal point of the first lens group G1 comes close to the original surface P side, and this avoids enlargement of the lens diameter.

Thus, in this embodiment, as a requisite condition for enabling use of the projection optical system PL at high resolution, condition (1) below is satisfied. The imaging optical system PL is constituted by three groups, wherein the focal point position adjusting function is provided by the second lens group G2 or the third lens group G3. Additionally and more preferably, at least one of conditions (2)-(5) below is satisfied.

That is, in this embodiment, the components are set so as to satisfy the following conditions:

$$0.01 < R \times K/F < 1.0 \quad (1)$$

$$0.04 < Lt/F2 < 0.10 \quad (2)$$

$$-0.15 < Lt2/F3 < -0.01 \quad (3)$$

$$-0.5 < F2/F1 < -0.2 \quad (4)$$

$$0.3 < BFw/\sqrt{(Fw/Ft)} < 0.9 \quad (5)$$

where R (dot/mm) is resolution per single line in the main scan direction of the image reading apparatus; K is picture element size of the reading means (sensor); F is F number of the imaging optical system PL at the largest magnification; Lt is one of (i) the spacing between the first and second lens groups G1 and G2 at a telephoto end and (ii) the spacing between the second and third lens groups G2 and G3, which is narrower than the other; Lt2 is the spacing between the second and third lens groups G2 and G3 at the telephoto end; Fi is the focal length of the i-th lens group Gi; Fw and Ft are focal lengths of the whole system at the wide-angle end and the telephoto end, respectively; and BFw is the distance from the final lens surface to the reading means Q, at the wide-angle end (it may be converted in terms of air if there is a face plate or filter or the like between the lens final surface and the reading means Q)

Technical significance of conditions (1)-(5) will be described below.

Condition (1) is to assure matching between the image reading apparatus and an imaging optical system to be mounted therein. The resolution R referred to there is that the unit of inch in the dpi (dot per inch) is converted into the unit of millimeter so that it means the number of dots per millimeter. Although the unit system is different, what is expressed is the same. Also, where what is called "picture element slipping" is carried out, the resolution per single line before the slipping is taken as R. The symbol K refers to the picture element size of the sensor such as CCD or CMOS.

If the F number (Fno) of the imaging optical system becomes dark beyond the lower limit of condition (1) or the picture element size of the sensor become small, for the high resolution reading there would occur a large decrease of MTF due to diffraction, and sufficient resolution would be no more attainable. If this occurs, then even if the focal point position adjusting means operates, there is no position that enables satisfactory resolution. Therefore, the provision of the focal point position adjusting means itself becomes meaningless. To the contrary, if the F number (Fno) becomes bright beyond the upper limit of condition (1), the response of MTF would become peaky such that the MTF response would not be obtainable even with a small error of focal point position caused by the focal point position adjusting means. Further, if the picture element size of the sensor becomes too large, it leads to an enlargement of the sensor length itself, which causes enlargement of the size of the imaging optical system or an increase of cost of the sensor.

As a matter of course, these inconveniences become notable in the case of high resolution of 1200 dpi or more.

The peaky response mentioned above refers to the phenomenon that, in a graph with defocus taken on the axis of abscissa and MTF taken on the axis of ordinate, only a small change of defocus causes a radical change of MTF. Thus, in the case of this embodiment, a very small motion of the focus lens will cause a large change of MTF. Thus, it becomes very difficult to control the focus lens to plate it at the MTF best (largest) focus position.

Condition (2) concerns the ratio between the lens group spacing and the focal length of the second lens group where the focal point position is to be adjusted by the second lens group. It is to assure compactness of the lens system as a while on one hand and to keep sufficient clearance even during focal point position adjustment, on the other hand. If the lens group spacing becomes narrower beyond the lower limit of condition (2) or the focal length of the second lens group becomes longer to cause increased movement amount, then a change in focus position due to a change in position of the original or a change in telephoto end position resulting from a manufacturing error, would result in interference of the lens groups. To the contrary, if the lens group spacing becomes wider beyond the upper limit of the condition (2), the lens system as a whole becomes bulky. Also, if the focal length of the second lens group becomes shorter beyond the upper limit, there arises a problem of degradation of aberrations or narrowed tolerance for the precision of lens stop position because of increased position sensitivity of the second lens group.

Condition (3) is similar to condition (2) and it concerns the ratio between the lens group spacing and the focal length of the third lens group when the focal point position is to be adjusted by the third lens group. It is to assure compactness of the lens system as a while on one hand and to keep sufficient clearance even during focal point position adjustment, on the other hand. If the lens group spacing becomes narrower beyond the upper limit of condition (3) or the focal length of the third lens group becomes longer to cause increased movement amount, then a change in focus position due to a change in position of the original or a change in telephoto end position resulting from a manufacturing error, would result in interference of the lens groups. To the contrary, if the lens group spacing becomes wider beyond the lower limit of the condition (3), the lens system as a whole becomes bulky. Also, if the focal length of the third lens group becomes shorter beyond the upper limit, there arises a problem of degradation of aberrations or narrowed tolerance for the precision of lens stop position because of increased position sensitivity of the third lens group.

Condition (3) concerns the ratio of focal length between the first and second lens groups, and it is to assure compactness of the whole lens system and also to well correct distortion aberration. If the focal length of the first lens group becomes longer beyond the upper limit of condition (4), the first lens group becomes large and distortion aberration becomes worse. If the focal length of the first lens group becomes shorter beyond the lower limit of condition (4), distortion aberration in the first lens group becomes worse and, in order to correct this, the whole lens system must be enlarged.

Condition (5) relates to the ratio between the back focus (from the final lens surface to image plane being converted in terms of air) at the telephoto end and the focal length of the whole lens system at the middle of the wide-angle end and telephoto end. It is to assure compactness of the whole system on one hand and to reduce changes of aberrations resulting from adjustment of the focal point position, on the other hand. If the back focus becomes shorter beyond the lower limit of condition (5), the third lens group would become enlarged and the position in the neighborhood of the telephoto end through which an off-axis light flux passes would change largely. This causes large variation of aberrations. If the focal length becomes longer beyond the lower limit, the object-to-image distance is enlarged and the lens system as a whole becomes large. To the contrary, if the upper limit of condition (5) is exceeded, due to widening of the angle, the position through which the off-axis light flux passes would change largely, causing large variation of aberration.

In this embodiment, more preferably, the numerical range for conditions (1)-(5) may be set as follows.

$$0.01 < R \times K/Fno < 0.5 \quad (1')$$

$$0.05 < Lt/F2 < 0.09 \quad (2')$$

$$-0.12 < Lt2/F3 < -0.01 \quad (3')$$

$$-0.45 < F2/F1 < -0.2 \quad (4')$$

$$0.35 < BFw/\sqrt{(Fw/Ft)} < 0.80 \quad (5')$$

In this embodiment, as described above, the imaging optical system PL having focal length changing means is provided with focal point position adjusting means, by which deviation of focus position due to various error factors or strict requirement for focal point position adjustment, as required by increases of dpi, can be fully met.

Thus, with this embodiment, satisfactory focal point position adjustment can be accomplished even in an image reading apparatus of 1200 dpi or more.

Further, in this embodiment, the first lens group G1 is constituted by a lens group having a negative refractive power, by which reduction in size of the first lens group G1 is met. Also, in this embodiment, the imaging optical system PL is constituted by, in an order from the original surface P side, the fist lens group G1 of negative refractive power, the second lens group G2 of positive refractive power, and the third lens group G3 of negative refractive power. This assures reduction of back focus and lens total length. Furthermore, in this embodiment, the magnification changing function and the focal point position adjusting function are taken by the second and third lens groups G2 and G3. This effectively reduces the size of the imaging optical system PL. Further, in this embodiment, the imaging optical system PL is structured such as described above, and this effectively assures compactness and better correction of aberrations.

Further, in this embodiment, the focal point position adjustment is carried out by one of the lens groups (second lens group or third lens group) which is lighter in weight than the other. This is effective to reduce load of driving means such as a motor, and it enables use of smaller size driving means.

Next, numerical examples 1-5 corresponding to first to fifth embodiments of the present invention will be described. In numerical examples 1-5, Ri is curvature radius of i-th lens surface in an order from the original surface side, Di is thickness of i-th optical element or air spacing in an order from the original surface side, and Ni and vi are refractive index and abbe's number, respectively, of i-th optical element in an order from the original surface side. As regards aspherical surface shape, when X axis is taken on the optical axis direction, H axis is taken on a direction perpendicular to the optical axis, and the advancement direction of light is taken as positive, and where r is paraxial curvature field, and B, C and D are aspheric surface coefficients, respectively, it can be expressed as follows:

$$X = \frac{\left(\frac{1}{r}\right)H^2}{1 + \sqrt{\left(1 - (1+K)\left(\frac{H}{r}\right)^2\right)}} + BH^4 + CH^6 + DH^8$$

The air spacing between an original table glass and the first lens is omitted. Also, f is the focal length of the whole system, FNo is F number when the image distance is at infinite, β is imaging magnification (image reading magnification), and R18-R19 denote surfaces of a cover or protective glass of the CCD.

Also, Table 1 below shows the relationship between the above-described conditions and numerical values of the numerical examples.

NUMERICAL EXAMPLE 1

```
f = 31.67-49.85    FNo = 5.41-7.06    β = -0.189--0.378
R1 = 3718.199    D1 = 2.00        N1 = 1.83400    ν1 = 37.2
R2 = 29.332      D2 = 6.92
R3 = 31.269      D3 = 3.69        N2 = 1.84666    ν2 = 23.8
R4 = 59.256      D4 = variable
R5 = 25.443      D5 = 3.44        N3 = 1.58913    ν3 = 61.1
R6 = -142.037    D6 = 0.20
R7 = 17.326      D7 = 3.25        N4 = 1.60311    ν4 = 60.6
R8 = 45.871      D8 = 0.56
R9 = -149.911    D9 = 5.82        N5 = 1.67270    ν5 = 32.1
R10 = 13.299     D10 = 1.80
R11 = stop (SP)  D11 = 0.32
R12 = 18.091     D12 = 3.42       N6 = 1.48749    ν6 = 70.2
R13 = -56.815    D13 = variable
R14 = -33.700    D14 = 6.04       N7 = 1.80518    ν7 = 25.4
R15 = -24.938    D15 = 6.87
R16 = -12.702    D16 = 4.70       N8 = 1.74949    ν8 = 35.3
R17 = -24.000    D17 = -0.20
R18 = ∞          D18 = 0.70       N9 = 1.51633    ν9 = 64.2
R19 = ∞
Variable Spacing\β:  -0.189  -0.378
D4:               25.331      2.013
D13:               7.041      1.613
Resolution: 2400 dpi, Picture Element Size: 4 μm
```

NUMERICAL EXAMPLE 2

```
f = 33.373-52.505   FNo = 5.51-7.21    β = -0.189--0.378
R1 = -1605.402   D1 = 2.50        N1 = 1.83400    ν1 = 37.2
R2 = 32.149      D2 = 7.28
R3 = 33.069      D3 = 3.53        N2 = 1.84666    ν2 = 23.8
R4 = 62.382      D4 = variable
R5 = 30.379      D5 = 4.45        N3 = 1.69680    ν3 = 55.5
R6 = -151.690    D6 = 0.20
R7 = 18.945      D7 = 4.13        N4 = 1.60311    ν4 = 60.6
R8 = 43.571      D8 = 0.64
R9 = -107.861    D9 = 5.85        N5 = 1.7211     ν5 = 29.2
R10 = 16.102     D10 = 1.38
R11 = stop (SP)  D11 = 1.90
R12 = 23.480     D12 = 5.79       N6 = 1.48749    ν6 = 70.2
R13 = -40.624    D13 = variable
R14 = -42.720    D14 = 5.00       N7 = 1.76182    ν7 = 26.5
R15 = -29.749    D15 = 6.00
R16 = -14.663    D16 = 2.50       N8 = 1.65844    ν8 = 55.9
R17 = -30.572    D17 = 0.00
R18 = ∞          D18 = 0.70       N9 = 1.51633    ν9 = 64.2
R19 = ∞
Variable Spacing\β:  -0.189  -0.378
D4:               25.629      2.039
D13:               8.546      2.186
Resolution: 1200 dpi, Picture Element Size: 8 μm
```

NUMERICAL EXAMPLE 3

```
f = 36.529-52.057   FNo = 5.03-6.87    β = -0.189--0.321
R1 = -1605.856   D1 = 2.50        N1 = 1.83400    ν1 = 37.2
R2 = 32.222      D2 = 6.53
R3 = 32.095      D3 = 3.21        N2 = 1.84666    ν2 = 23.8
R4 = 59.983      D4 = variable
R5 = 35.463      D5 = 3.16        N3 = 1.69680    ν3 = 55.5
R6 = -122.786    D6 = 0.20
R7 = 19.470      D7 = 3.58        N4 = 1.60311    ν4 = 60.6
R8 = 47.777      D8 = 1.00
R9 = -92.035     D9 = 6.47        N5 = 1.69895    ν5 = 30.1
R10 = 17.159     D10 = 1.54
R11 = stop (SP)  D11 = 2.37
R12 = 23.600     D12 = 6.41       N6 = 1.48749    ν6 = 70.2
R13 = -36.917    D13 = variable
R14 = -109.559   D14 = 3.55       N7 = 1.69895    ν7 = 30.1
R15 = -56.190    D15 = 3.45
R16 = -14.456    D16 = 4.04       N8 = 1.51633    ν8 = 64.2
R17 = -38.523    D17 = 0.00
R18 = ∞          D18 = 0.70       N9 = 1.51633    ν9 = 64.2
R19 = ∞
Variable Spacing\β:  -0.189  -0.321
D4:               19.898      2.279
D13:              11.968      7.660
Resolution: 2040 dpi, Picture Element Size: 4 μm
```

NUMERICAL EXAMPLE 4

```
f = 37.338-53.270   FNo = 5.54-6.81    β = -0.189--0.321
R1 = 2410.960    D1 = 2.23        N1 = 1.83400    ν1 = 37.2
R2 = 32.355      D2 = 6.47
R3 = 32.938      D3 = 3.21        N2 = 1.84666    ν2 = 23.8
R4 = 58.559      D4 = variable
R5 = 29.051      D5 = 5.39        N3 = 1.69680    ν3 = 55.5
R6 = -145.181    D6 = 0.20
R7 = 18.701      D7 = 3.91        N4 = 1.60311    ν4 = 60.6
R8 = 37.349      D8 = 0.91
R9 = -90.943     D9 = 4.80        N5 = 1.69895    ν5 = 30.1
R10 = 17.086     D10 = 1.98
R11 = stop (SP)  D11 = 1.77
R12 = 25.356     D12 = 4.61       N6 = 1.48749    ν6 = 70.2
R13 = -41.637    D13 = variable
R14 = 68.143     D14 = 6.23       N7 = 1.58306    ν7 = 30.2
R15 = -38.232    D15 = 3.00
R16 = -14.005    D16 = 4.70       N8 = 1.49171    ν8 = 57.4
R17 = -32.658    D17 = 0.00
R18 = ∞          D18 = 0.70       N9 = 1.51633    ν9 = 64.2
R19 = ∞
```

-continued

Aspheric Surfaces:

R15: K = 1.97457E+0  B = 4.64835E−6  C = 8.16523E−9  D = −2.36852E−10
R17: K = 3.39286E−1  B = −3.59117E−7  C = −3.92157E−9  D = 7.22697E−11
Variable Spacing\β: −0.189 −0.321
D4:  21.412  2.847
D13: 10.047  5.802
Resolution: 2040 dpi, Picture Element Size: 4μm

NUMERICAL EXAMPLE 5

| | | |  |
|---|---|---|---|
| f = 40.865-45.272 | FNo = 2.76-2.87 | β = −0.5−−0.7 | |
| R1 = 130.605 | D1 = 2.50 | N1 = 1.74950 | ν1 = 35.3 |
| R2 = 33.212 | D2 = 6.47 | | |
| R3 = 35.003 | D3 = 2.58 | N2 = 1.76182 | ν2 = 26.5 |
| R4 = 59.804 | D4 = variable | | |
| R5 = 28.208 | D5 = 5.89 | N3 = 1.69680 | ν3 = 55.5 |
| R6 = −197.406 | D6 = 0.20 | | |
| R7 = 22.569 | D7 = 5.37 | N4 = 1.60311 | ν4 = 60.6 |
| R8 = 35.091 | D8 = 1.12 | | |
| R9 = −117.824 | D9 = 6.47 | N5 = 1.78472 | ν5 = 25.7 |
| R10 = 21.814 | D10 = 1.53 | | |
| R11 = stop (SP) | D11 = 2.69 | | |
| R12 = 20.782 | D12 = 2.65 | N6 = 1.48749 | ν6 = 70.2 |
| R13 = −110.116 | D13 = variable | | |
| R14 = −56.570 | D14 = 2.29 | N7 = 1.58306 | ν7 = 30.2 |
| R15 = −20.425 | D15 = 2.27 | | |
| R16 = −12.595 | D16 = 4.70 | N8 = 1.49171 | ν8 = 57.4 |
| R17 = −44.903 | D17 = 0.00 | | |
| R18 = ∞ | D18 = 0.70 | N9 = 1.51633 | ν9 = 64.2 |
| R19 = ∞ | | | |

Aspheric Surfaces:

R5:  K = −4.00013E−1  B = 9.50790E−7  C = 1.68737E−9  D = 4.47396E−12
R15: K = 8.76396E−1  B = 3.13488E−5  C = −1.51977E−7  D = −2.91064E−9
R17: K = 2.62273E+1  B = 2.37193E−5  C = −3.86405E−7  D = 8.19581E−9
Variable Spacing\β: −0.50 −0.70
D4:  15.464  2.995
D13:  7.212  6.493
Resolution: 2222 dpi, Picture Element Size: 8 μm

TABLE 1

| Condition No. | 1ST EMBODIMENT | 2ND EMBODIMENT | 3RD EMBODIMENT | 4TH EMBODIMENT | 5TH EMBODIMENT |
|---|---|---|---|---|---|
| (1) | 0.054 | 0.052 | 0.047 | 0.047 | 0.244 |
| (2) | 0.056 | 0.063 | 0.070 | 0.088 | 0.085 |
| (3) | −0.021 | −0.029 | −0.114 | −0.068 | −0.052 |
| (4) | −0.372 | −0.388 | −0.387 | −0.394 | −0.231 |
| (5) | 0.381 | 0.392 | 0.392 | 0.413 | 0.756 |

[Image Reading Apparatus]

Figure 7:
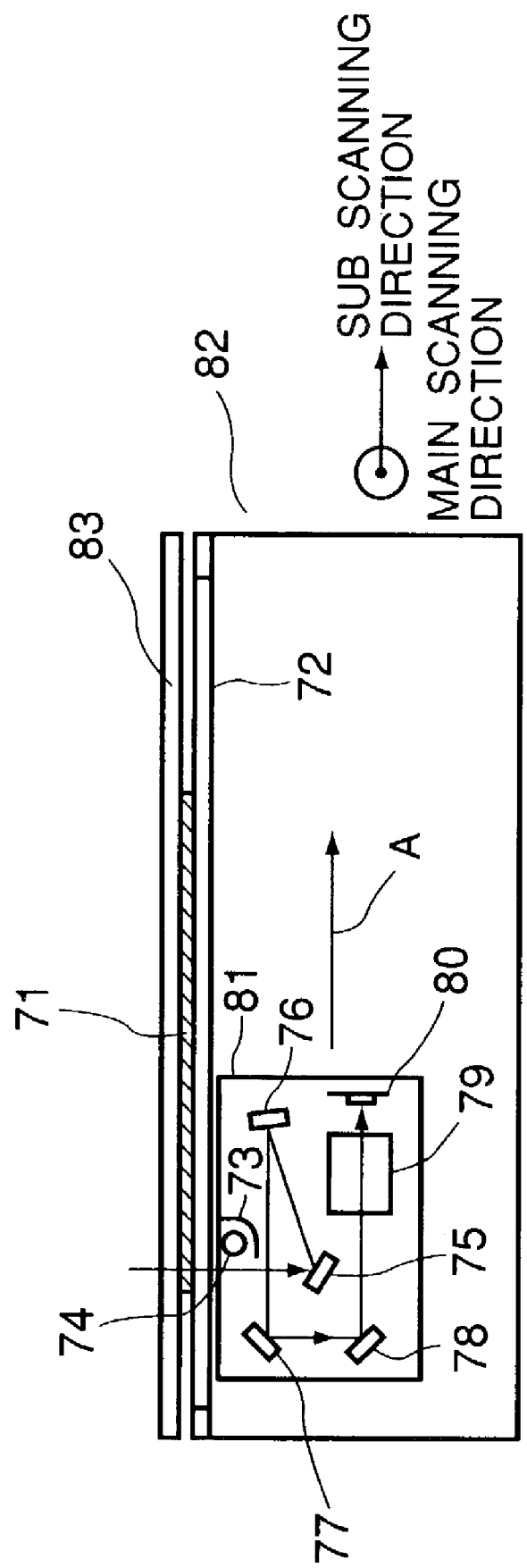
FIG. 7 is a schematic view of a main portion of an image reading apparatus according to an embodiment of the present invention.

FIG. 7 is a schematic view of a main portion of an image reading apparatus such as a digital copying machine, wherein an imaging optical system (image reading lens) according to any one of the numerical examples 1-5 is incorporated.

Denoted in the drawing at 72 is an original table glass on which an original 72 is carried. Denoted at 81 is a carriage which integrally accommodates therein an illumination light source 74, a reflection plate 73, reflection mirrors 75, 76, 77, and 78, an imaging optical system 79, and reading means 80 such as a line sensor. By means of a driving unit (not shown) such as a sub scan motor, it scans in a sub scan direction (direction of an arrow A in FIG. 7) so as to read the imagewise information on the original 71. The illumination light source 74 comprises a fluorescent light or halogen lamp, for example. The reflection cover plate 73 serves to reflect light from the light source 74 to illuminate the image efficiently. The first, second, third and fourth reflection mirrors 75, 76, 77, and 78 function to deflect the path of the light from the original 71 inside the carriage 81. The imaging optical system 79 is an image reading lens and has a structure according to any one of the numerical examples 1-5 described hereinbefore. It serves to image the light, based on the imagewise information of the original 71, upon the surface of the reading means 80. The reading means 80 comprises a line sensor (CCD). Denoted at 82 is a main unit of the apparatus, and denoted at 83 is a pressing plate.

In this embodiment, the light emitted from the illumination light source 74 illuminates the original 71 directly or by way of the reflection cover 73. Light reflected from the original 71 is directed while the path of it is deflected by the first to fourth reflection mirrors 75-78 inside the carriage 81, and it is imaged by the imaging optical system 79 upon the CCD surface 80. By moving the carriage 81 in the direction of arrow A (sub scan direction) by means of the sub scan motor, the imagewise information is read.

In this embodiment, an imaging optical system according to any one of the numerical example 1-5 is applied to an image reading apparatus of integral type (flat bed type). However, the invention is not limited to this. The invention can be applied similarly also to an image reading apparatus having a 1:2 scan optical system.

Furthermore, while in this embodiment an imaging optical system according to any one of the numerical examples 1-5 is applied to an image reading apparatus of a digital copying machine, the invention is not limited to this. It can be applied image reading apparatuses of various types such as an image scanner and a film scanner, for example.

In accordance with the present invention as has been described above, an imaging optical system is provided with focal length changing means and focal point position adjusting means and, by setting the components appropriately, an image reading apparatus capable of reading an image with high resolution can be accomplished.

Additionally, in accordance with the present invention, an imaging optical system may comprise a negative first lens group, a positive second lens group, and a negative third lens group. The second and third lens groups may be moved to perform the magnification change, while the second lens group and/or the third lens group may be moved to perform adjustment of the focal point position. With this arrangement, an image reading apparatus with a compact imaging optical system, capable of reading an image with very high resolution can be accomplished.

While the invention has been described with reference to the structures disclosed herein, it is not confined to the details set forth and this application is intended to cover such modifications or changes as may come within the purposes of the improvements or the scope of the following claims.

What is claimed is:

1. An image reading apparatus, comprising:
    illumination means for illuminating an original;
    reading means for reading image information; and
    an imaging optical system for imaging information provided on a surface of the original, as illuminated by said illumination means, upon a surface of said reading means, said imaging optical system including, in order from the original surface side, a first lens group of negative refractive power, a second lens group of positive refractive power, and a third lens group of negative refractive power;
    wherein the first lens group is held fixed for magnification change, and a condition $0.01 < R \times K/F < 1.00$ is satisfied where R is resolution per single line in a main scan direction of said image reading apparatus, K is picture element size of said reading means, and F is F number of said imaging optical system at a largest imaging magnification,
    wherein a focal point position can be adjusted by moving the second lens group, and wherein a condition $0.04 > Lt/F2 > 0.10$ is satisfied where F2 is the focal length of the second lens group, and Lt is one of (i) the spacing between the first and second lens groups at a telephoto end and (ii) the spacing between the second and third lens group at a telephoto end, which is narrower than the other.

2. An apparatus according to claim 1, wherein the first lens group includes a negative first lens having a concave surface facing the reading means side, and a positive second lens, wherein the second lens group includes a positive first lens, a positive second lens, a negative third lens, and a positive fourth lens, and wherein said third lens group includes a negative or positive first lens, and a negative second lens.

3. An apparatus according to claim 1, wherein magnification change can be carried out by moving the second and third lens groups so that the spacing between the first and second lens groups at a telephoto end becomes smaller than that of the first and second lens groups a wide-angle end and so that the spacing between the second and third lens groups at a telephoto end becomes smaller than that of the first and second lens groups at a wide-angle end.

4. An image reading apparatus, comprising:
    illumination means for illuminating an original;
    reading means for reading image information; and
    an imaging optical system for imaging information provided on a surface of the original, as illuminated by said illumination means, upon a surface of said reading means, said imaging optical system including, in order from the original surface side, a first lens group of negative refractive power, a second lens group of positive refractive power, and a third lens group of negative refractive power;
    wherein the first lens group is held fixed for magnification change, and a condition $0.01 < R \times K/F < 1.00$ is satisfied where R is resolution per single line in a main scan direction of said image reading apparatus, K is picture element size of said reading means, and F is F number of said imaging optical system at a largest imaging magnification,
    wherein the focal point position can be adjusted by moving the third lens group, and wherein a condition $-0.015 < Lt2/F3 < -0.01$ is satisfied where F3 is the focal length of the third lens group, and Lt2 is the spacing between the second and third lens groups at a telephoto end.

5. An image reading apparatus, comprising:
    illumination means for illuminating an original;
    reading means for reading image information; and
    an imaging optical system for imaging information provided on a surface of the original, as illuminated by said illumination means, upon a surface of said reading means, said imaging optical system including, in order from the original surface side, a first lens group of negative refractive power, a second lens group of positive refractive power, and a third lens group of negative refractive power;
    wherein the first lens group is held fixed for magnification change, and a condition $0.01 < R \times K/F < 1.00$ is satisfied where R is resolution per single line in a main scan direction of said image reading apparatus, K is picture element size of said reading means, and F is F number of said imaging optical system at a largest imaging magnification, wherein conditions $-0.5 < F2/F1 < -0.2$ and $0.3 > BFw/\sqrt{(Fw \times Ft)} > 0.9$ are satisfied, where Fi is the focal length of the i-th lens group, Fw and Ft are focal lengths of the whole system at a wide-angle end and a telephoto end, respectively, and BFw is the distance from the final lens surface to said reading means at a wide-angle end.

6. An apparatus according to any one of claims 2,3 and 1, wherein the focal point position can be adjusted by moving one of the first to third lens groups which has a lightest weight.

7. An apparatus according to any one of claims 2,3, and 1,4,5 wherein said apparatus has a resolution of not less than 1200 dpi.

* * * * *

UNITED STATES PATENT AND TRADEMARK OFFICE
CERTIFICATE OF CORRECTION

| | |
|---|---|
| PATENT NO. | : 7,224,498 B2 |
| APPLICATION NO. | : 10/331541 |
| DATED | : May 29, 2007 |
| INVENTOR(S) | : Nobuyuki Tochigi |

It is certified that error appears in the above-identified patent and that said Letters Patent is hereby corrected as shown below:

COLUMN 3:

Line 6, "groups" should read --groups at--.

COLUMN 4:

Line 15, "to" should read --to as--.

COLUMN 5:

Line 3, "regard" should read --regards--;
    Line 11, "a" should be deleted; and
    Line 30, "mean" should read --means--.

COLUMN 6:

Line 8, "means Q)" should read --means Q).--;
    Line 47, "plate" should read --place--; and
    Line 54, "while" should read --whole--.

COLUMN 7:

Line 7, "while" should read --whole--.

COLUMN 8:

Line 16, "fist" should read --first--.

COLUMN 13:

Line 21, "example" should read --examples--; and
    Line 30, "applied" should read --applied to--.

COLUMN 14:

Line 11 claim 1, "group" should read --groups--; and
    Line 25 claim 3, "groups" should read --groups at--.

UNITED STATES PATENT AND TRADEMARK OFFICE
CERTIFICATE OF CORRECTION

PATENT NO.         : 7,224,498 B2
APPLICATION NO.    : 10/331541
DATED              : May 29, 2007
INVENTOR(S)        : Nobuyuki Tochigi It is certified that error appears in the above-identified patent and that said Letters Patent is hereby corrected as shown below:

COLUMN 16:

Line 1 claim 6, "claims 2, 3 and 1," should read --claims 1 to 3,--;
Line 5 claim 7, "claims 2, 3 and" should read --claims 1 to 5,--; and
Line 6 claim 7, "1, 4, 5 wherein" should read --wherein--.

Signed and Sealed this

Ninth Day of September, 2008

JON W. DUDAS
*Director of the United States Patent and Trademark Office*